United States Patent
Hottinen et al.

(10) Patent No.: US 8,064,823 B2
(45) Date of Patent: Nov. 22, 2011

(54) APPARATUS, METHOD AND COMPUTER PROGRAM PRODUCT FOR DETERMINING TRANSMIT WEIGHTS IN RELAY NETWORKS

(75) Inventors: Ari Hottinen, Espoo (FI); Peter Fertl, Vienna (AT)

(73) Assignee: Nokia Corporation, Espoo (FI)

( * ) Notice: Subject to any disclaimer, the term of this patent is extended or adjusted under 35 U.S.C. 154(b) by 759 days.

(21) Appl. No.: 11/998,520

(22) Filed: Nov. 30, 2007

(65) Prior Publication Data

US 2009/0143008 A1   Jun. 4, 2009

(51) Int. Cl.
 *H04B 7/15* (2006.01)
(52) U.S. Cl. ..... 455/11.1; 455/101; 455/13.1; 455/13.4; 370/433; 370/274; 375/148; 375/299
(58) Field of Classification Search ............... 455/11.1, 455/101, 13.1, 13.4, 7, 9, 16, 70; 370/433, 370/274; 375/148, 299
See application file for complete search history.

(56) References Cited

U.S. PATENT DOCUMENTS

| | | | | |
|---|---|---|---|---|
| 5,809,020 | A * | 9/1998 | Bruckert et al. | 370/335 |
| 2005/0085195 | A1 | 4/2005 | Tong et al. | 455/101 |
| 2005/0117660 | A1 * | 6/2005 | Vialle et al. | 375/299 |
| 2006/0013245 | A1 * | 1/2006 | Abedi | 370/433 |
| 2006/0093065 | A1 * | 5/2006 | Thomas et al. | 375/299 |
| 2006/0105709 | A1 * | 5/2006 | Oh et al. | 455/13.1 |
| 2007/0129008 | A1 * | 6/2007 | Shi et al. | 455/11.1 |
| 2007/0149117 | A1 * | 6/2007 | Hwang et al. | 455/11.1 |
| 2007/0150928 | A1 * | 6/2007 | Hottinen | 725/127 |
| 2007/0189404 | A1 | 8/2007 | Baum et al. | 375/260 |
| 2007/0249296 | A1 * | 10/2007 | Howard et al. | 455/101 |
| 2009/0017753 | A1 * | 1/2009 | Kim et al. | 455/10 |

FOREIGN PATENT DOCUMENTS

| | | |
|---|---|---|
| EP | 1 359 684 A1 | 11/2003 |
| EP | 1 515 394 A2 | 3/2005 |
| GB | 2 311 446 A | 9/1997 |
| KR | 2006-0035358 A | 4/2011 |
| KR | 2005-0094870 A | 9/2011 |

(Continued)

OTHER PUBLICATIONS

"Delay-Differentiated Scheduling in a Randomized MIMO Relay Network", Ari Hottinen et al., Proc. EUSIPCO 2007, Sep. 2007, 4 pgs.

(Continued)

*Primary Examiner* — Shaima Q Aminzay
(74) *Attorney, Agent, or Firm* — Harrington & Smith

(57) ABSTRACT

Apparatus, methods and computer program products implement a channel-aware approach for controlling a relay network operative in a wireless communications system wherein weighting matrices are used at a MIMO-capable source electronic device and at the relays where at least one of the weighting matrices is selected or derived using knowledge of channel components of at least one channel link, where the channel link may be from the relays to the destination antennas of the destination device; or from source antennas of the MIMO-capable source device to the relays, or from the source antennas of the MIMO-capable source device to the destination antennas of the destination device. In one approach weighting matrices applied at the source and relay nodes are selected from a predetermined codebook of weighting matrices in dependence on monitored channel conditions. Alternatively, the weighting matrices may be determined using an eigenvalue decomposition and power allocation (e.g., water-filling) approach by using the effective channel correlation matrix possibly combined with the use of the noise correlation matrix.

17 Claims, 6 Drawing Sheets

FOREIGN PATENT DOCUMENTS

WO   WO-2004/075569 A2   9/2004

OTHER PUBLICATIONS

IEEE 802.16j-06/026r1 "Part 16: Air Interface for Fixed and Mobile Broadband Wireless Access Systems Multihop Relay Specification", Dec. 1, 2006.

J. Lorincz, "Physical Layer Analysis of Emerging IEEE 802.11n WLAN Standard", ISBN 89-5519-129-4, Feb. 20-22, 2006.
IEEE Std. 802.16e 2005 and IEEE Std. 802.16-2004/Cor1-2005 Part 16: Air Interface for Fixed and Mobile Broadband wireless Access Systems Amendment 2: Physical and Medium Access Control Layers for Combined Fixed and Mobile Operation in Licensed Bands and Corrigendum 1 Feb. 28, 2006.

* cited by examiner

APPARATUS, METHOD AND COMPUTER PROGRAM PRODUCT FOR DETERMINING TRANSMIT WEIGHTS IN RELAY NETWORKS

TECHNICAL FIELD

The invention generally relates to the field of mobile communication systems, and more particularly concerns mesh networks in which the collaborative use of relay nodes plays a key role.

BACKGROUND

In future wireless communications system (such as, for example 4G, IEEE 802.16j, IEEE 802.11 mesh networks, cognitive radio, etc.) relays nodes will play an increased role. Efforts have been made in the prior art to obtain a significant performance gain using multiple relay nodes. However, those skilled in the art seek further improvements. In particular, those skilled in the art seek methods, apparatus and computer program products that use available information to achieve further improvements in performance.

SUMMARY OF THE PREFERRED EMBODIMENTS

The foregoing and other problems are overcome, and other advantages are realized, in accordance with the following embodiments of the invention.

A first embodiment of the invention is an electronic device comprising: a radio communication apparatus configured to perform signal transmission operations in a wireless communications system having a plurality of relay nodes, where the plurality of relay nodes are configured to transmit signals related to signals transmitted by the electronic device to a destination electronic device using relay-specific weighting coefficients; a plurality of transmit antennas; a transmitter configured to transmit signals using the plurality of transmit antennas; and a signal control apparatus configured to modify signal configuration during signal transmission operations in dependence on channel conditions in the wireless communications system.

In variants of the first embodiment the signal control apparatus may be configured to modify modulation, coding and other aspects of transmitted signals in dependence on channel conditions. In other variants of the first embodiment, the signal control apparatus further comprises a beamforming apparatus configured to modify transmission beam patterns of the plurality of transmit antennas during signal transmission operations in dependence on channel conditions in the wireless communications system.

Further variants of the first embodiment are configured to operate with various relay nodes including, but not limited to, amplify-and-forward relay nodes; estimate-and-forward relay nodes; and decode-and-forward relay nodes. The signals transmitted by the relay nodes may be varied through amplification; recoding; remodulation, etc. Variants of the first embodiment may modify transmission beam patterns using various methods including, but not limited to, selecting beamforming matrices from pre-determined codebooks.

A second embodiment of the invention is an electronic device configured to operate as a relay node, the electronic device comprising: radio communication apparatus configured to perform bidirectional communication operations in a wireless communications system having a source electronic device, where the bidirectional communication operations comprise at least receipt of a signal from the source electronic device and transmission of a signal related to the signal received from the source electronic device to a destination electronic device, wherein the source electronic device is configured to modify radio transmission patterns during signal transmission operations; an antenna configured to receive the signal transmitted by the source electronic device; an antenna configured to transmit the signal related to the signal received from the source electronic device; and weighting apparatus configured to select a weighting coefficient to be applied to the related signal to be transmitted by the electronic device in dependence on channel conditions and to apply the selected weighting coefficient to the related signal to be transmitted by the electronic device.

Variants of the electronic device of the second embodiment may be configured to operate with various types of source electronic devices including, but not limited to, MIMO-capable source electronic devices having a plurality of antennas, the beampatterns of which are controlled with beamforming matrices selected from pre-determined codebooks, or source electronic devices having a single directional antenna with a controllable direction or radio transmission pattern.

A third embodiment of the invention is a method comprising: monitoring channel conditions in a wireless communications system comprised of a source electronic device configured to transmit signals to a destination electronic device and a plurality of relay nodes, each relay node configured to receive signals transmitted by the source electronic device and to transmit signals related to signals received from the source electronic device to the destination electronic device; and modifying a signal transmission pattern of at least one of the source electronic device and the relay nodes in dependence on the monitored channel conditions.

Modifying the signal transmission pattern of at least one of the source electronic device and the relay nodes in dependence on the monitored channel conditions in various exemplary and non-limiting variants may comprise selecting beamforming matrices from a predetermined codebook at a MIMO-capable source electronic device in dependence on monitored channel conditions; varying a direction or a radiation transmission pattern of a source electronic device having a transmission antenna with a controllable direction or radio transmission pattern in dependence on monitored channel conditions; or selecting a weighting coefficient from a beamforming matrix contained in a pre-determined codebook in dependence on monitored channel conditions.

A fourth embodiment of the invention is a method comprising: receiving a signal from a source electronic device operative in a wireless communications system at a relay node, wherein the source electronic device is configured to selectively modify signal transmission patterns during signal transmission operations; selecting at the relay node a weighting coefficient to be applied by the relay node to a signal related to the signal received from the source electronic device when the related signal is transmitted by the relay node, where the weighting coefficient is selected in combination with a signal transmission pattern modification to be applied to the signal transmitted by the source electronic device, and wherein at least one of the weighting coefficient applied by the relay node and the signal transmission pattern modification applied by the source electronic device is selected in dependence on channel conditions; and applying the weighting coefficient at the relay node to the signal to be transmitted by the relay node.

A fifth embodiment of the invention is a method comprising: receiving a signal from a MIMO-capable source electronic device operative in a wireless communications system via at least one relay node, wherein a beamforming matrix is applied to the signal by the MIMO-capable source electronic device; and selecting at the source MIMO-capable electronic device the beamforming matrix using channel measurements or conditions of an effective source-relay-destination channel.

A sixth embodiment of the invention is a computer program product comprising a computer-readable memory medium storing a computer program, the computer program configured to operate a source electronic device in a wireless communications system when executed, wherein when the computer program is executed the source electronic device is configured to monitor channel conditions in the wireless communications system, wherein relay nodes operative in the wireless communication system are configured to receive signals transmitted by the source electronic device and transmit signals related to the signals received from the source electronic device; to select a signal transmission pattern modification to be applied to the signal transmitted by the source electronic device in combination with a beamforming matrix comprised of relay-specific signal weighting coefficients to be applied to the related signals transmitted by the plurality of relays in the wireless communications system, wherein at least one of the signal transmission pattern modification applied by the source electronic device and the beamforming matrix comprised of relay-specific weighting coefficients is selected in dependence on the monitored channel conditions; and to apply the selected signal transmission pattern modification to the signal transmitted by the source electronic device during communication operations.

A seventh embodiment of the invention is a computer program product comprising a computer-readable memory medium storing a computer program, the computer program configured to operate a relay node in a wireless communications system when executed, wherein when the computer program is executed the relay node is configured to receive a signal from a source electronic device operative in the wireless communications system, wherein the source electronic device is configured to selectively apply signal transmission pattern modifications during signal transmission operations; to select a weighting coefficient to be applied by the relay node to a signal to be transmitted by the relay node, where the signal to be transmitted is related to the signal received from the source electronic device and wherein the weighting coefficient is selected in combination with signal transmission pattern modification applied to the signal transmitted by the source electronic device, and further wherein at least one of the weighting coefficient and the signal transmission pattern modification is selected in dependence on channel conditions; and to apply the weighting coefficient to the signal to be transmitted by the relay node.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
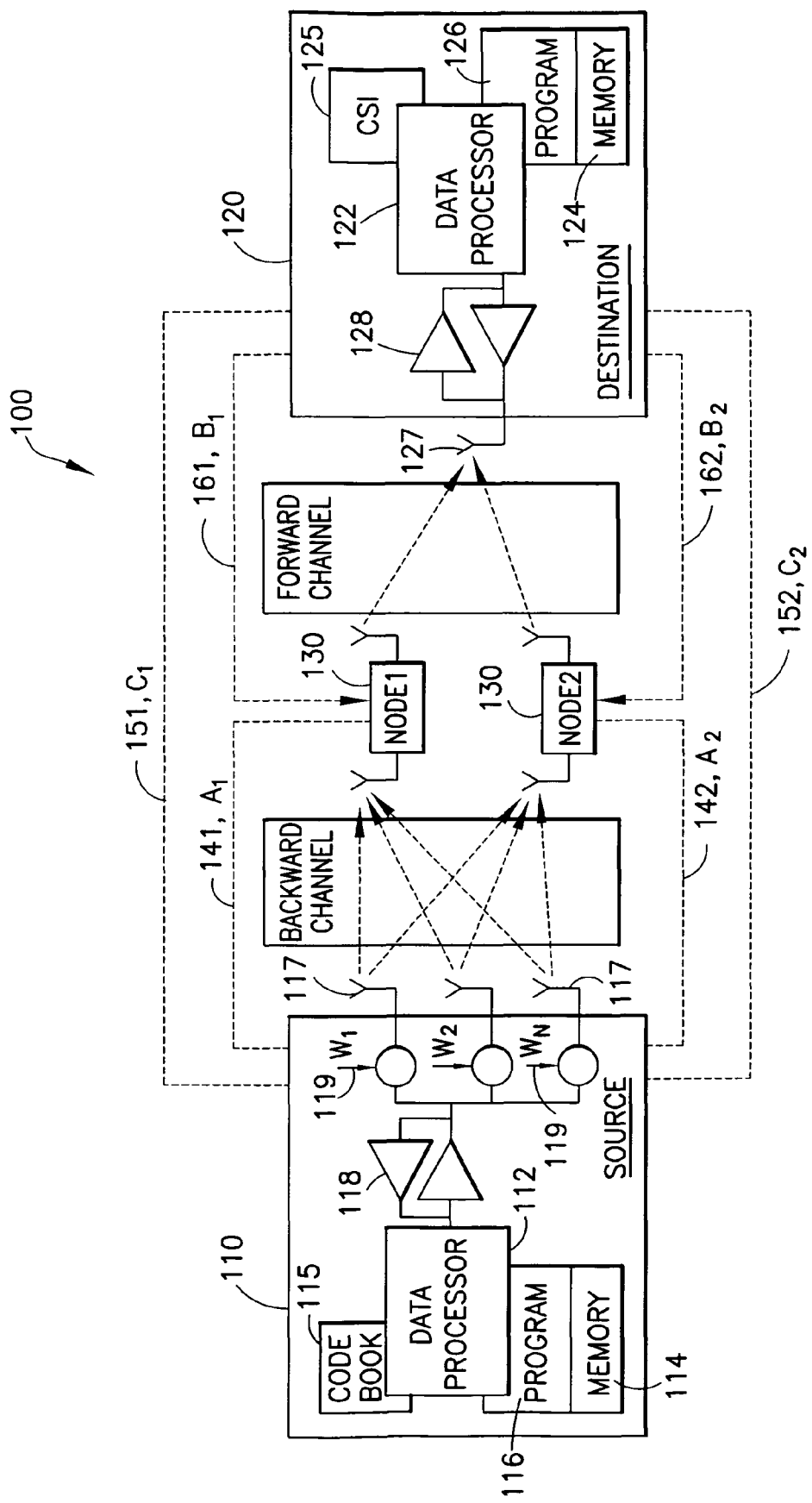
FIG. 1 is a block diagram depicting a system in which the invention may be practiced.
Figure 2:
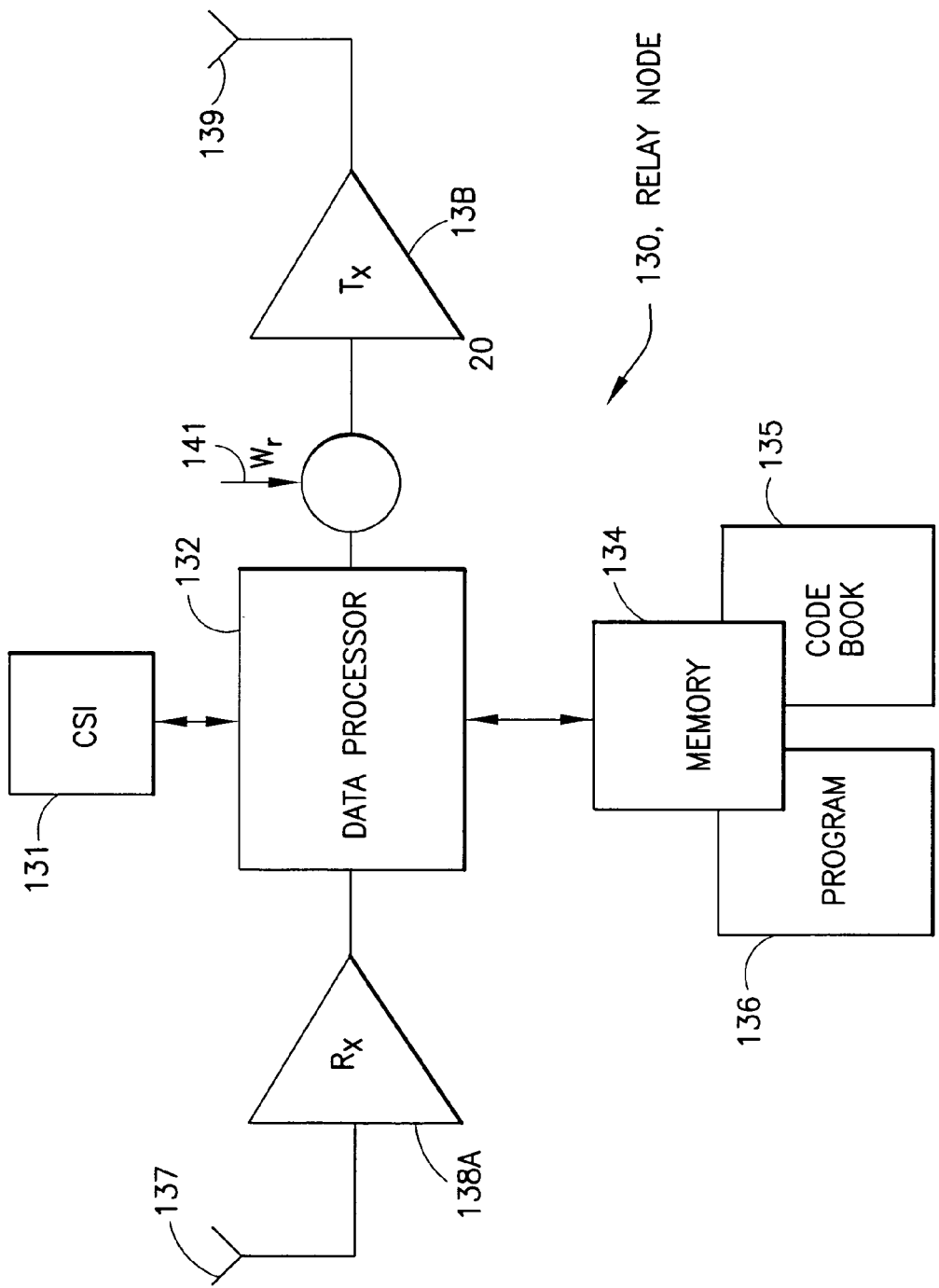
FIG. 2 is a block diagram depicting in greater detail the relay nodes of FIG. 1.

Before describing in detail the exemplary embodiments of this invention, a description is first made of FIGS. 1 and 2 for illustrating simplified block diagrams of various electronic devices that are suitable for use in practicing the exemplary embodiments of this invention. In FIG. 1 a wireless network 100 is adapted for communication between a MIMO-capable source node 110 and a destination node 120. As depicted, signals transmitted by the plurality of antennas 117 of source node 110 are received by relay nodes 130 and signals related to the signals received by the relays nodes from the source node are transmitted by the relay nodes to destination node 120. The source node 110 includes a data processor (DP) 112, a memory (MEM) 114 that stores a program (PROG) 116, a suitable radio frequency (RF) transceiver 118 for bidirectional wireless communications with destination node 120 and relay nodes 130, and a codebook 115 storing beamforming weighting coefficients 119 that are applied to signals transmitted by the antennas 117. Destination mode 120 also includes a DP 122, a MEM 124 that stores a PROG 126, a suitable RF transceiver 128, and channel state information ("CSI") apparatus 125.

The relay nodes (referenced as relay node 130 for convenience) include at least one receive antenna 137, at least one receiver 138A, a data and/or signal processor 132, such as a digital signal processor (DSP), a memory 134 wherein program code (136) is stored for operating the processor 132, at least one transmitter 138B, at least one transmit antenna 139 and a channel state information unit 131. The relay node further comprises a codebook 135 of beamforming weighting coefficients to be applied by the relay node 130 when transmitting signals related to signals received from the source node 120.

At least one of the PROGs 116, 126 and/or 136 is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 112 of the source node 110, by the DP 122 of the destination node 120, by the DP 132 of the relay node 130, or by hardware, or by a combination of software and hardware.

In general, the various embodiments of the source node 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 132 may be of any type suitable to the local technical environment, and may include one or more of general purpose computers, special purpose computers, microprocessors, digital signal processors (DSPs) and processors based on a multi-core processor architecture, as non-limiting examples.

Also illustrated in FIG. 1 is the feedback of channel state information (represented by $B_1, B_2$ (161,162) and $C_1, C_2$ (151, 152)) from the destination node 120 to the relay nodes 130 and the source node 110 and from relay nodes 130 to the source node (represented by $A_1, A_2$ (141,142)). The feedback of channel state information is performed by the channel state units 125 and 131, respectively of destination node 120 and relay nodes 130. Any of the aforementioned feedback links may be used alone or in combination with each other. For example, there may be only a feedback link from the destination to the source node. The feedback may be related to actual channel states, channel measurements, or related parameters, such as information related to the used transmission beamforming vectors or matrices. The feedback information may also depend on other parameters or measurements than channel conditions. For example it can depend on the available transmission resources (e.g. modulation and coding options or available transmit power) at the source node, or on available receive resources at destination (such as available signal processing resources for signal reception). While explicit feedback is used typically in FDD systems, the feedback in TDD systems (where channel reciprocity holds) may alternatively, or in addition, comprise pilot signals (or known signals) that can be used at the source node to directly estimate channel related information discussed above. For example, if the destination sends a pilot signal in a TDD reverse link slot, the channel matrices or effective channel matrices can be estimated at the source device.

Now the various non-limiting and exemplary embodiments of the invention will be described. The MIMO relay network in which methods, apparatus and computer program products of the invention may be implemented comprises the source node 110 with $N_t$ transmit antennas 117, R single-antenna relay nodes 130, and a destination node 120 with $N_d$ receive antennas 127 (a single antenna is shown in FIG. 1 for convenience).

A source node 110 transmits a signal x through a $N_t \times R$ MIMO channel F using a beamforming matrix $\Lambda_1$ with total transmit power P, where R designates the number of relay nodes 130. Each relay node 130 multiplies the signal with a relay-specific complex weighting coefficient $w_r$, 141. These are collected in a diagonal matrix $$\Lambda_2 = \text{diag}(w_1, \ldots, w_R) \quad (1)$$

The $N_d \times R$ MIMO channel from the relay nodes 130 to the destination 120 is given by H. In a two-hop amplify-and-forward network, the relays 130 transmit at the same time and the destination receives a signal related to the effective source-relay-destination signal model $$y = H\Lambda_2 F\Lambda_1 x + H\Lambda_2 n_r + n_d \quad (2)$$

where the elements of complex Gaussian vector $n_r$ designate noise with variance $\sigma_r^2$ at each relay node, and elements of $n_d$ designate complex Gaussian noise with variance $\sigma_d^2$ at each destination antenna. The capacity with i.i.d. Gaussian sources (in terms of bits-per-channel-use (bpcu)) for the signal model (2) is $$\alpha = \frac{1}{2}\log_2 \det\left(I + PH\Lambda_2 F\Lambda_1 \Lambda_1^\dagger F^\dagger \Lambda_2^\dagger H^\dagger R_{nn}^{-1}\right) \quad (3)$$

where the noise correlation matrix is $$R_{nn} = (\sigma_d^2 I + \sigma_r^2 H\Lambda_2 \Lambda_2^\dagger H^\dagger) \quad (4)$$

Factor ½ in model (3) is due to two-hop relaying.

The weighting coefficients 141 in matrix $\Lambda_2$ are used above to control the transmit power and transmit phase of each relay node. There are several ways of determining the transmit power (including feedback from another node in the network) in order to make sure that an amplify-and-forward node transmits with some maximum power or that it does not amplify noise more than necessary. Here, as an example, the amplitudes are set to satisfy $$|w_r| = \sqrt{\frac{P_2/R}{\sum_{n=1}^{} |\tilde{f}_{r,n}|^2 + \sigma_r^2}} \quad (5)$$

where $\sigma_r^2$ designates the variance of each element of noise vector $n_r$, $P_2$ is the desired total transmit power of all R relay nodes 130, and $\tilde{f}_{r,n}$ is the element (r,n) of matrix $\tilde{F} = F\Lambda_1$.

Next to be discussed is the optimization of $\Lambda_1$ and $\Lambda_2$ in apparatus, computer program products and methods of the invention. There are several ways of determining the matrices $\Lambda_1$ and $\Lambda_2$. Some numerical optimization algorithm that optimizes a common objective jointly with respect to the two matrices may be used to this effect. However, typically wireless standards (like 3GPP Release 7 and 8 and IEEE 802.16e) include a set of beamforming codebooks which involves selecting the matrices from a set of predefined set of matrices, so this is the first approach to be discussed.

Consider, as an example, a codebook-selection approach. In one solution $\Lambda_1$ is determined (conditionally) for a given $\Lambda_2$ (or vice versa), or they may be jointly selected. In a non-limiting case, it is assumed that the second matrix is diagonal, with weighting coefficients $\Lambda_2[c] = \text{diag}(w_1[c], \ldots, w_R[c])$, where $c = 1, \ldots, C$ and C is the number of codebook elements. Similarly for $\Lambda_1$ matrix, except that it is generally a "full" matrix. If it is a diagonal, the relative powers of the diagonal elements are different (for at least two elements). When both matrices are selected from a codebook, $c_1$ and $c_2$ denote the indices of first and second codebook, respectively.

Formally, the received signal is $$y[c_1, c_2] = H\Lambda_2[c_2]F\Lambda_1[c_1]x + H\Lambda_2[c_2]n_r + n_d, \; c_1 = 1, \ldots, C, \; c_2 = 1, \ldots, C. \quad (6)$$

Naturally, the codebooks may have a different number of entries, but above it is assumed that both have C elements, to simplify notation. The capacity (or some other performance measure) is computed essentially as above, and it depends on selected codebook entries (it is typically different whenever either $\Lambda_1$ or $\Lambda_2$ matrix is changed). The capacity for codebook entries $c_1, c_2$ is denoted as $\alpha[c_1, C_2]$. The codebook-selection may be solved via $$[\hat{c}_1, \hat{c}_2] = \underset{c_1, c_2}{\arg\max}\, \alpha[c_1, c_2]. \quad (7)$$

Naturally, optimization may occur only with respect to one index, keeping the other fixed (e.g. if that link cannot be controlled).

The above case assumes that individual matrices are optimized based on the knowledge of the effective channel between source 110 and destination 120 ($C_2$, 152 in FIG. 1). Alternatively, if only parts of the channels are known (e.g. F or H) the source weighting matrix may be optimized using only F, or the relay to destination link using only H. However, in this case only partial knowledge is used and thus leads to suboptimal performance. On the other hand, if the relays 130 are decode-and-forward or some other types of relays, then it is likely (more) optimal to optimize the matrices separately.

Alternatively, the weighting matrix $\Lambda_1$ may be determined (optimized) for the given $\Lambda_2$ (selected by any method, e.g. from a codebook as given below), using the signal model eq. (2). In this case, the formal model resembles that of MIMO, with the important exception that the effective MIMO channel is affected by the relays and comprises two or more constituent channels each operating in two different orthogonal channels (e.g. time slots). In this case, the beamforming matrix can be determined using an eigenvalue decomposition and power allocation (water-filling or similar) approach by using the effective channel correlation matrix $H_{\it eff}=H\Lambda_2 F\Lambda_1 \Lambda_1^\dagger F^\dagger \Lambda_2^\dagger H^\dagger$, possibly combined with the use of the noise correlation matrix. In place of eigenvalue or singular value decomposition (applied to the effective channel rather than channel correlation matrix), one may use any other technique for determining the beamforming matrix for the source. These include, but are not limited to, codebook selection as discussed above, here based on the effective channel, iterative refinement methods, where different beams are determined separately and are possibly dependent on each other, and so on. Current wireless standards, such as IEEE 802.11n, IEEE 802.16e, and 3GPP systems includes additional examples of determining transmit beamforming matrix and resource allocation for the source. However, when using these, or any other method, it is important to explicitly account for the relay nodes. For example, if different time-slots are used in different hops, the effective channel, affected by the relay, can only be measured or constructed after the second hop. During the first hop, the destination may be able to receive also a signal from the source, if a direct link to source exists, but this channel can not be used for optimizing source beamforming matrix for the relay-aided channel. Thus, the operational mode of the relays (e.g. when or in which channel they transmit signals) need to be generally known to the unit that estimates or measures the effective channel.

Next to be discussed is a performance example comprising $\Lambda_2$ for 1-R-1 network. As a special case, a relay system is considered where one source terminal 110 communicates with one destination terminal 120 through a set of five relay nodes 130, all having single transmit antennas. Here, the codebook at the source ($\Lambda_1$) equals an identity matrix and the codebook (in this case, the weights) at the relays ($\Lambda_2$) is adapted using the feedback links $B_1, B_2$ (161, 162). At the destination the effective channel phases of each source-relay-destination path is estimated separately using a pilot sequence transmitted from the source. This is done by choosing the weights at the relays according to the columns of an identity matrix (i.e., activating one relay after another). However, any other method that computes each path's channel phase separately can be used. Single-tap Rayleigh fading backward and forward channels and additive, zero-mean, white Gaussian noise are assumed at the relays and the destination. A transmission frame consists of a training sequence and an uncoded data sequence of BPSK-modulated symbols.

Figure 3:
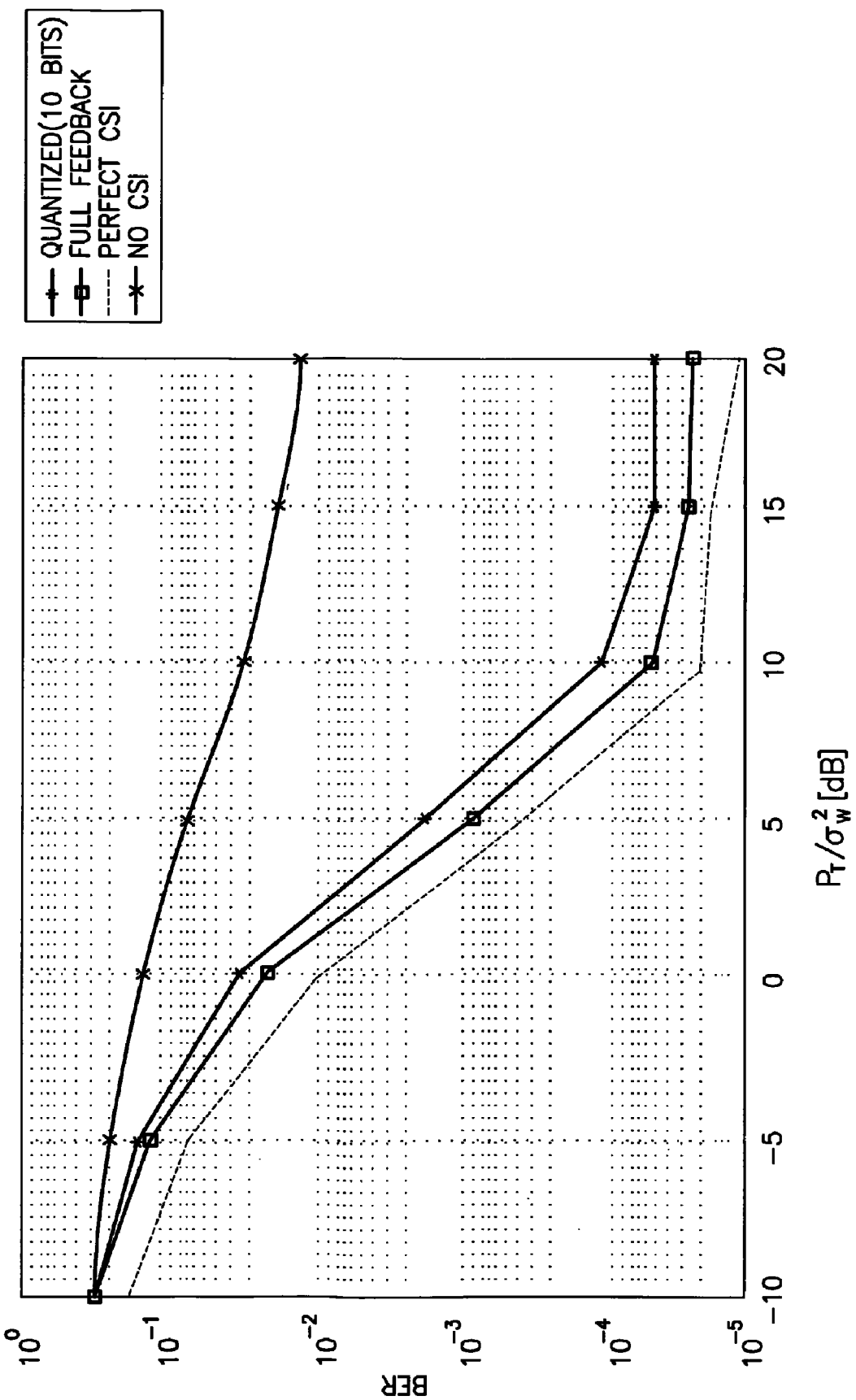
FIG. 3 is a chart depicting performance of a system operating in accordance with the invention under various assumptions.

FIG. 3 shows the bit-error rate versus signal-to-noise ratio (SNR) using a total of 10-bit feedback (labeled "quantized"). In particular, each estimated channel phase is quantized using 2 bits (2 bits sent for each relay node). Here SNR is defined as $P_T/N_0$ where $P_T$ denotes the total average transmit power at the relays and $N_0$ denotes the received power at the destination. The SNR of the received signal at the relays is fixed at 20 dB. As a comparison the following reference scheme is shown (labeled "full feedback"): here, the full channel phase information is fed back to the relays. Also presented are the extreme cases where the relay nodes have perfect CSI available in order to calculate the weights (labeled "perfect CSI") and the case where no CSI is available (labeled "no CSI"). In the latter, the receive signals are noncoherently combined and thus there is no possibility to achieve a beamforming gain or transmit diversity.

It can be seen that the performance of the quantized scheme closely approaches the performance of the full feedback method. It is noted that the remaining performance gap to the perfect CSI case can be further decreased by increasing the pilot overhead.

Figure 4:
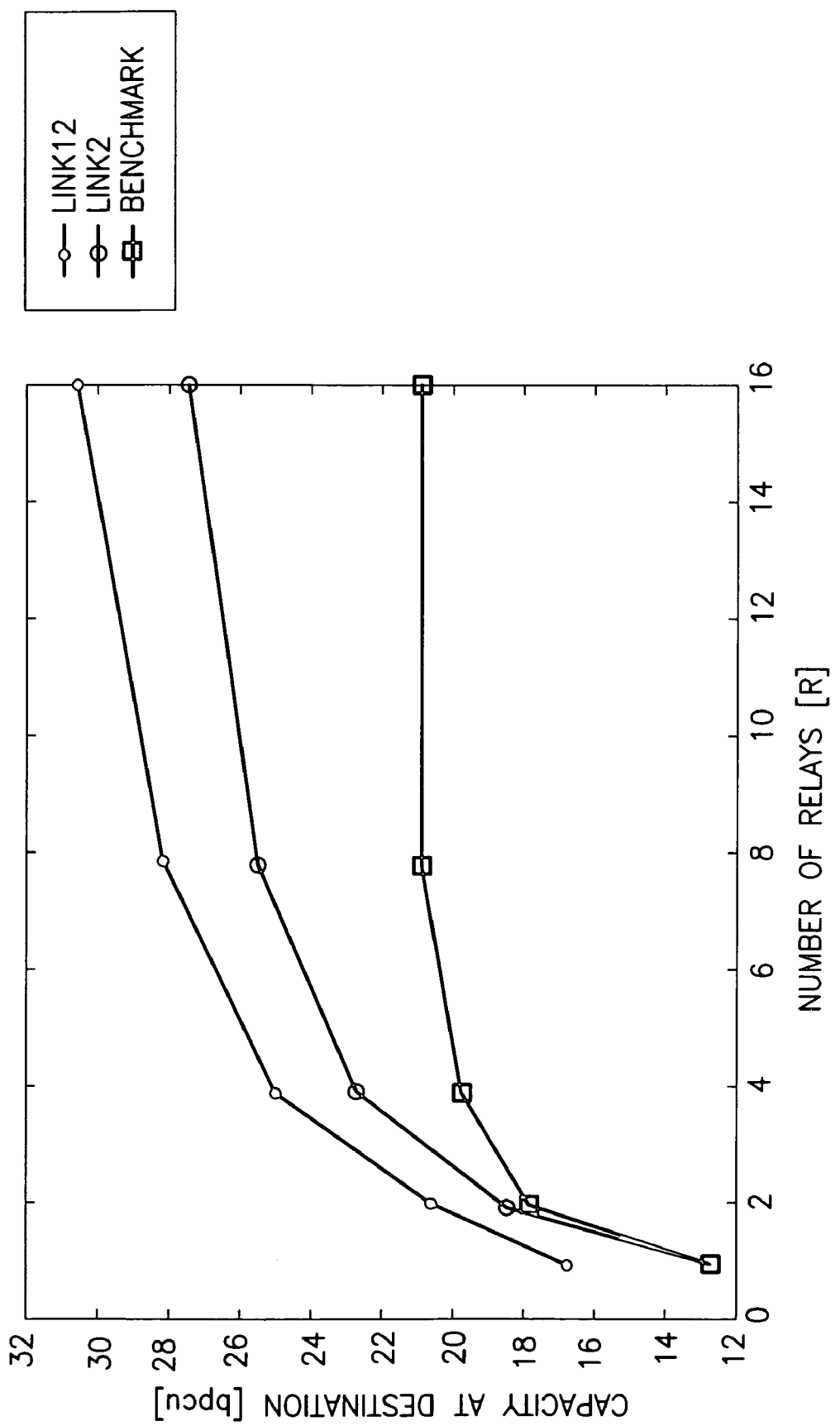
FIG. 4 is a chart depicting capacity of a system operating in accordance with the invention under different optimization assumptions.

Next to be discussed is an optimization approach for a 4-R-2 network. FIG. 4 shows the capacity at the destination in the three cases. In the first case, only matrix $\Lambda_2$ is optimized from a codebook while keeping $\Lambda_1=I$ fixed (legend 'Link2'). In the second case, the $\Lambda_1$ is optimized via the eigenbeam-approach for each of the C codebook entries of $\Lambda_2$ and the best of the C capacities is plotted (legend 'Link12'). It is seen that the eigenbeam case gives better result due to effective channel matching to the overall source-relay-destination channel. Also, the figure shows the performance for a benchmark case (legend 'Benchmark'), when relay matrices $\Lambda_1$ and $\Lambda_2$ are both set to an identity matrix of appropriate dimension (i.e. no control of weighting matrices). Clearly, the invention improves performance (capacity) significantly. Alternatively, the method can be used to reduce required transmit power or transmission bandwidth for some given desired capacity.

Next to be discussed is implementation. There are different ways of estimating matrices H and F, or the effective channel involving the product of these and the weighting matrices. To determine the effective channel, one may send pilots from source only and estimate the effective channel, or the received signal model in equation (2), or the related effective correlation matrix. In addition, or instead, pilot signals may be sent from relay only or from both relay and source, depending on what signal model or parameters thereof are used in optimization of transmission beamforming information. Also, proper weighting matrices may be used when estimating the channel matrices, and these matrices are typically different from those used in transmitting the information-bearing signal.

The invention allows relay nodes to be used in an effective way in a wireless network using operations that are already embedded in many wireless systems (such as codebook selection or closed-loop MIMO). These methods are used here in a different network model, either iteratively (conditionally) or via joint optimization.

The benefit can be also understood in terms of beamforming terminology. Optimizing the first link ensures that the signal transmitted from the source antennas is received better at the relay antennas that are assigned to the source (less interference elsewhere, or higher receiver power at relay antennas, depending on use case). When optimizing the first weighting matrix using the effective channel, the relay output channel is implicitly taken into account, and hence this is different from simple beamforming at the source node.

Figure 5:
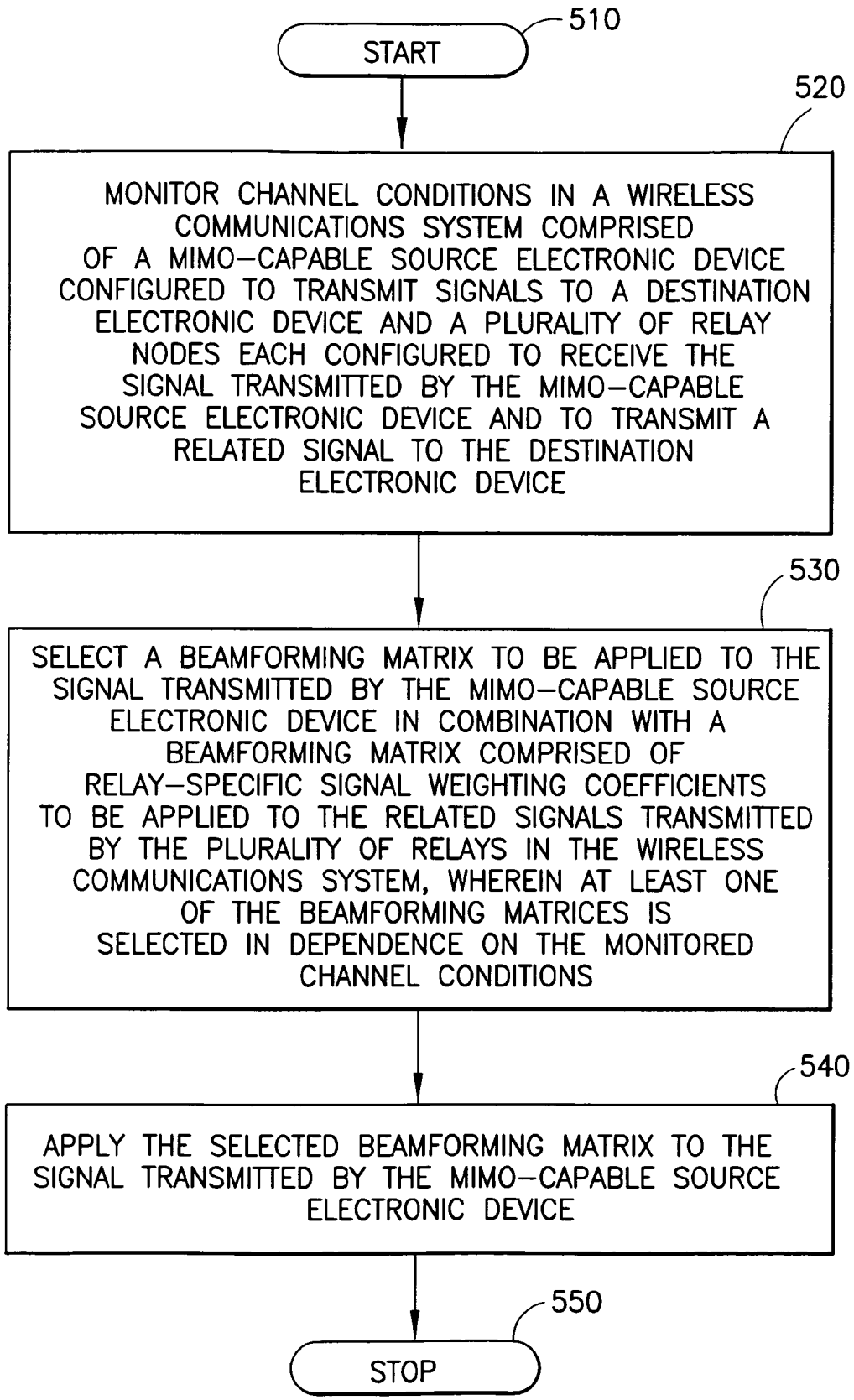
FIG. 5 is a flow chart depicting a method operating in accordance with the invention.
Figure 6:
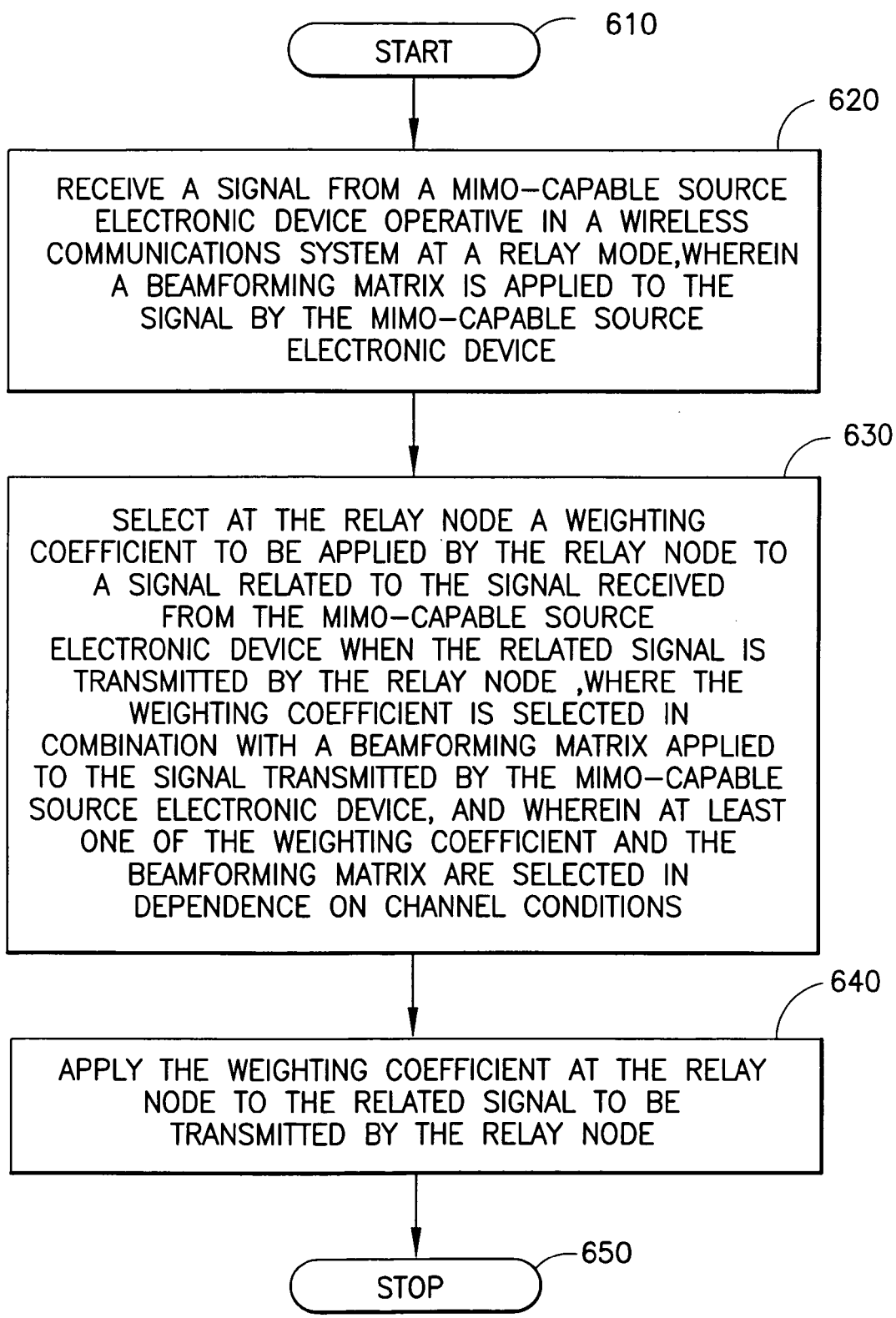
FIG. 6 is a flow chart depicting another method operating in accordance with the invention.

FIGS. 5 and 6 are flowcharts summarizing the foregoing methods. FIG. 5 may be practiced at a MIMO-capable source electronic device operative in a wireless communications network. The method starts at 510. Next, at 520, the source electronic device monitors channel conditions in a wireless communications system comprised of the MIMO-capable source electronic device configured to transmit signals to a destination electronic device and a plurality of relay nodes each configured to receive the signal transmitted by the MIMO-capable source electronic device and to transmit a signal related to the signal received from the source electronic device to the destination electronic device. Then, at 530, the MIMO-capable source electronic device selects a beamforming matrix to be applied to the signal transmitted by the MIMO-capable source electronic device in combination with a beamforming matrix comprised of relay-specific signal weighting coefficients to be applied to the related signals transmitted by the plurality of relays in the wireless communications system, wherein at least one of the beamforming matrices is selected in dependence on the monitored channel conditions. Next, at 540, the source electronic device applies the selected beamforming matrix to the signal transmitted by the MIMO-capable source electronic device during communication operations. The method stops at 550.

FIG. 6 is a flowchart depicting a method that may be practiced at a relay node. The method starts at 610. Next, at 620, the relay node receives a signal from a MIMO-capable source electronic device operative in a wireless communications system at a relay node, wherein a beamforming matrix is applied to the signal by the MIMO-capable source electronic device. Then, at 630, the relay node selects a weighting coefficient to be applied by the relay node to a signal related to the signal received from the MIMO-capable source electronic device when the related signal is transmitted by the relay node, where the weighting coefficient is selected in combination with a beamforming matrix applied to the signal transmitted by the MIMO-capable source electronic device, and wherein at least one of the weighting coefficient and the beamforming matrix are selected in dependence on channel conditions. Next, at 640, the relay node applies the weighting coefficient to the related signal to be transmitted by the relay node. The method stops at 650.

As used herein "signal control apparatus"; "beamforming apparatus"; "weighting apparatus"; and "power control apparatus" refer to the programs and data processors of the source electronic devices and relay nodes that are configured to perform signal control operations, beamforming operations, signal weighting operations and power control operations when appropriate program instructions are executed. In alternate embodiments, the signal control apparatus, beamforming apparatus, weighting apparatus and power control apparatus may comprise special-purpose circuits, other hardware elements, or combinations of hardware firmware and software elements known to those skilled in the art. The present invention encompasses any and all alternative implementations.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The sources and relays may also include other related control functions, e.g. rate control, MIMO/MISO modulation and coding control, determination of transport formats for the sources or relay nodes etc, or any other techniques that affect the choice of beamforming or vice versa.

Thus it is seen that the foregoing description has provided by way of exemplary and non-limiting examples a full and informative description of the best methods and apparatus presently contemplated by the inventors for determining transmit weights in relay networks. One skilled in the art will appreciate that the various embodiments described herein can be practiced individually; in combination with one or more other embodiments described herein; or in combination with encoders differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

What is claimed is:

1. An apparatus comprising:
at least one data processor; and
at least one memory storing a computer program, in which the at least one memory and the computer program are configured, with the at least one data processor, to cause the apparatus to at least:
receive a signal originating from a source device; and
apply a relay-specific weighting coefficient $w_r$ to transmit the received signal in conjunction with at least one other relay node which each apply a relay-specific weighting coefficient, in which each relay-specific weighting coefficient is selected from a matrix $\Lambda_2$ and the relay-specific weighting coefficients are jointly optimized with regard to one another.

2. The apparatus of claim 1 wherein the received signal is transmitted with a matrix $\Lambda_1$ which is conditional on the matrix $\Lambda_2$.

3. The apparatus of claim 2, wherein the matrix $\Lambda_1$ is a beamforming matrix that is determined using an eigenvalue decomposition.

4. The apparatus of claim 3, wherein the beamforming matrix $\Lambda_1$ is determined in view of the matrix $\Lambda_2$.

5. The apparatus of claim 3 wherein the beamforming matrix $\Lambda_1$ is further determined using a power allocation and an effective channel correlation matrix.

6. The apparatus of claim 5 wherein the beamforming matrix $\Lambda_1$ is further determined using a noise correlation matrix.

7. The apparatus of claim 1 wherein the apparatus comprises at least one of an amplify-and-forward relay node and a decode-and-forward relay node.

8. The apparatus of claim 1 wherein the weighting coefficients are selected from a predetermined codebook.

9. The apparatus of claim 8, wherein the weighting coefficients are selected from the predetermined codebook in order to satisfy a pre-determined criterion.

10. The apparatus of claim 9 wherein the pre-determined criterion comprises channel capacity.

11. The apparatus of claim 1, wherein the at least one memory and the computer program product is configured, with the at least one data processor, to further cause the apparatus to receive quantized channel state information describing channel conditions, and wherein the matrix $\Lambda_2$ is generated in dependence on the channel conditions.

12. The apparatus of claim 11, wherein the at least one memory and the computer program is configured, with the at least one data processor, to further cause the apparatus to receive at least one pilot signal for use in determining the channel conditions.

13. A method comprising:
receiving a signal originating from a source device; and
applying a relay-specific weighting coefficient $w_r$ to transmit the received signal in conjunction with at least one other relay node which each apply a relay-specific weighting coefficient, in which each relay-specific weighting coefficient is selected from a matrix $\Lambda_2$ and the relay-specific weighting coefficients are jointly optimized with regard to one another.

14. The method of claim 13, wherein the received signal is transmitted with a matrix $\Lambda_1$ which is conditional on the matrix $\Lambda_2$.

15. A computer-readable memory storing a computer program which when executed by at least one data processor causes actions comprising:
monitoring channel conditions in a wireless communications system comprising a plurality of relay nodes operative to relay transmissions from a source device;
selecting at the source device a signal transmission pattern modification to be applied to a signal originating from the source device in combination with a beamforming matrix $\Lambda_1$; and
applying the selected signal transmission pattern modification to the signal transmitted by the source device; and
transmitting the signal in conjunction with at least one relay node which each apply a relay-specific weighting coefficient, in which each relay-specific weighting coefficient is selected from a matrix $\Lambda_2$ and the relay-specific weighting coefficients are jointly optimized with regard to one another, wherein the signal is transmitted with a matrix $\Lambda_1$ which is conditional on a matrix $\Lambda_2$ of the at least one relay node.

16. A computer-readable memory storing a computer program which when executed by at least one data processor causes actions comprising:
receiving a signal originating from a source device; and
applying a relay-specific weighting coefficient $w_r$ to transmit the received signal in conjunction with at least one other relay node which each apply a relay-specific weighting coefficient, in which each relay-specific weighting coefficient is selected from a matrix $\Lambda_2$ and the relay-specific weighting coefficients are jointly optimized with regard to one another.

17. The computer-readable memory storing the computer program of claim 16, wherein the received signal is transmitted with a matrix $\Lambda_1$ which is conditional on the matrix $\Lambda_2$.

* * * * *